Sept. 7, 1937.                I. C. GELLMAN                2,092,276
                            BREAD SLICING MACHINE
                           Filed Oct. 18, 1935        3 Sheets-Sheet 1

INVENTOR.
Israel C. Gellman
BY Threedy and Gannon
HIS ATTORNEYS.

Sept. 7, 1937. I. C. GELLMAN 2,092,276
BREAD SLICING MACHINE
Filed Oct. 18, 1935 3 Sheets-Sheet 2

INVENTOR.
Israel C. Gellman
BY Threedy and Cannon
HIS ATTORNEYS.

Sept. 7, 1937.  I. C. GELLMAN  2,092,276
BREAD SLICING MACHINE
Filed Oct. 18, 1935   3 Sheets-Sheet 3
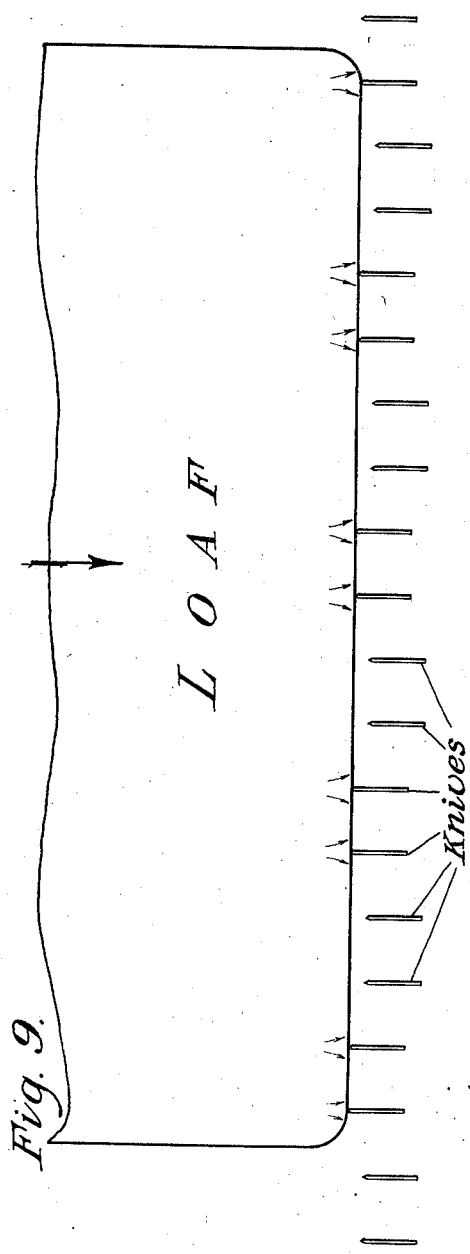
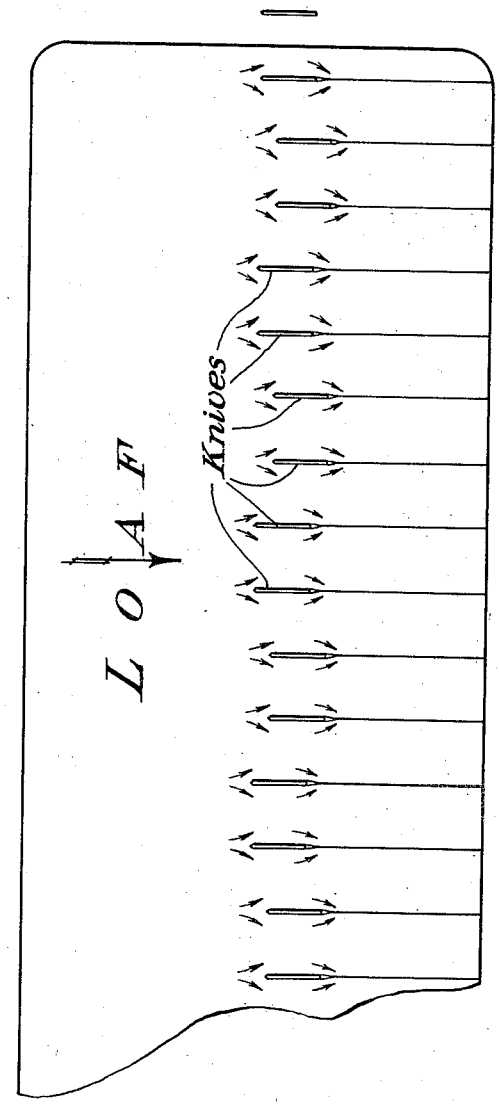
INVENTOR.
Israel C. Gellman
BY Threedy and Cannon
HIS ATTORNEYS.

Patented Sept. 7, 1937

2,092,276

UNITED STATES PATENT OFFICE 2,092,276

BREAD SLICING MACHINE

Israel C. Gellman, Rock Island, Ill.

Application October 18, 1935, Serial No. 45,532

11 Claims. (Cl. 146—153)

This invention relates to a bread slicing machine.

It is an object of this invention to provide an improved bread slicing machine which is relatively simple and inexpensive in construction and efficient in use.

In the art of bread slicing machines it has been found that when the knife frames and the slicing knives carried thereby reciprocate up and down during the slicing operation, the combined pressure of the knives upon the crust of the loaf as they enter the same to start the slicing operation, tends to crush the loaf and thereby peel of the crust, thus causing considerable damage to the loaf as well as a relatively large production of crumbs, and consequent undue wear and friction upon the knives and irregularly formed or non-uniform slices, it being noted that these objectionable results are caused, in the usual type of prior art bread slicing machines, by the fact that all of the knives in each of the two reciprocating knife-carrying frames in such machines enter into the crust, that is, start the slicing operation, at one time, and have their cutting edges arranged in a common transverse plane. The same is, of course, true relative to the end of the slicing operation, that is, when the knives leave the crust.

It has also been found that the friction upon the knives employed as in the usual prior art types of slicing machines is relatively so great that it has necessitated the use, in such bread slicing machines, of a loaf holder for holding the loaves in position and against up and down or quivering movement during the slicing operation; and it has been noted that when such loaf holders are in use, they tend to crush the loaves of bread and to distort or break the fibres of the same.

It is, therefore, an object of this invention to provide a bread slicing machine in which the above mentioned difficulties, experienced in the use of the prior art bread slicing machines, are eliminated, and in which the slicing knives are staggered relative to each other so that only part of the slicing knives in each reciprocating knife-carrying frame enter into the crust of the loaf or start the slicing operation at one time, thereby minimizing in a manner set forth hereinafter, the combined pressure of the knives upon the loaf at the start of the slicing operation, and also minimizing the friction of the loaf upon the knives during the slicing operation.

A further object of the present invention is to provide in a bread slicing machine a novel arrangement of the slicing knives, and which arrangement is relatively more efficient than the conventional arrangement of the slicing knives heretofore employed in the prior art slicing machines.

Another object of the present invention is to arrange the slicing knives in such a manner that only part of the slicing knives, preferably half of the same, start into the crust of the loaf at one time to start the slicing operation.

A further object of the invention is to arrange the knives in such a manner that the cutting edges of the knives are not all arranged or aligned in the same common transverse plane, as in the prior art machines.

Other objects of the present invention are: to provide a bread slicing machine and a novel arrangement of slicing knives therefor such that only half, or a fraction less than all, of the blades enter the loaf and leave the same at one time, although the cutting operation is started throughout the entire length or advancing face of the loaf as it enters the slicing machine; and to construct the same so that after the first set or half of the blades are well through the crust of the loaf, the second half or set of blades will start entering the crust of the loaf, thereby preventing a so-called soft center loaf of bread, such, for example, as white bread having a hard crust from being crushed by the combined pressure of all the knives at the start of the slicing operation, as happens in the use of the prior art machines when all of the slicing knives start slicing, that is, enter into the crust of the loaf at one time. The same is, of course, true relative to the action of the knives leaving the loaf through the crust at the end of the slicing operation.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
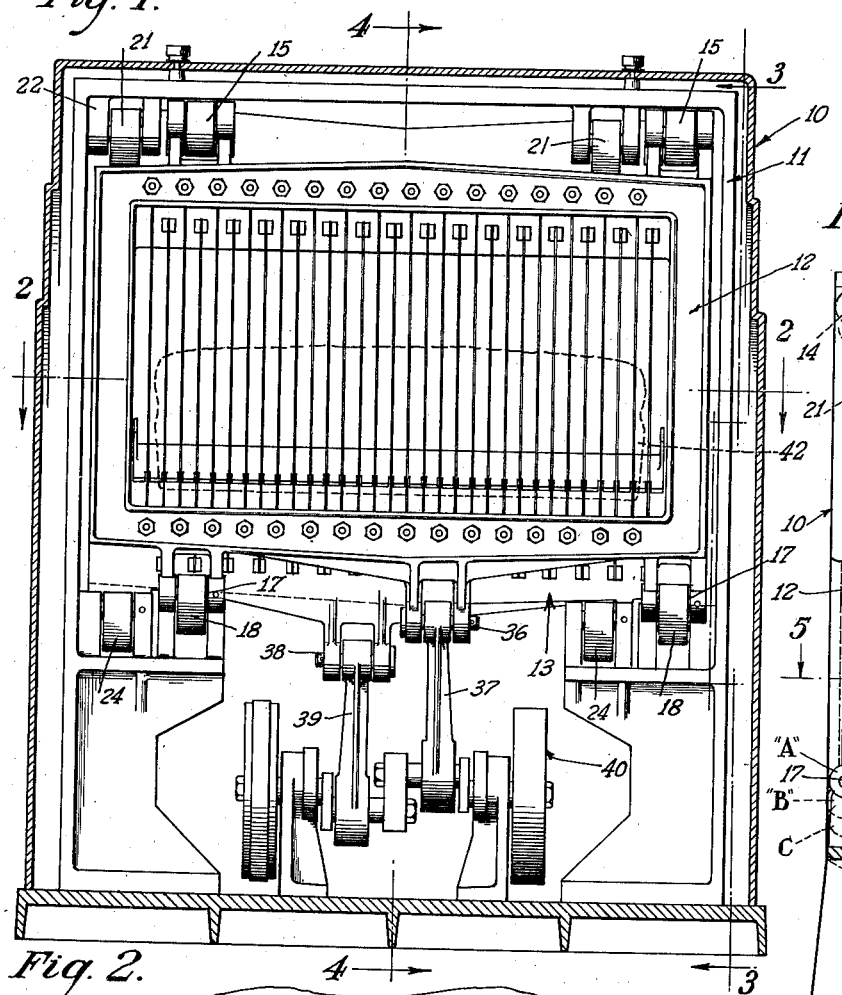
Fig. 1 is an elevational view of a bread slicing machine embodying a preferred form of the present invention.
Figure 3:
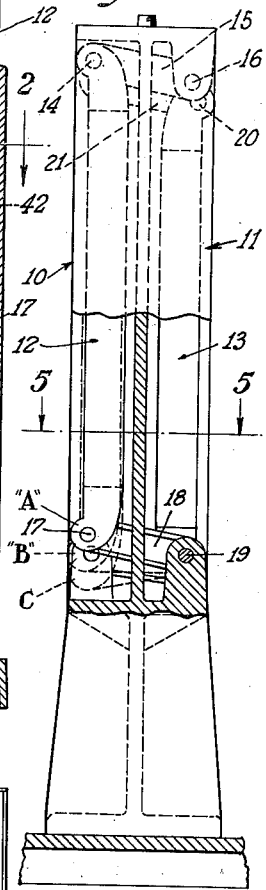
Fig. 3 is a side elevational view on line 3—3 in Fig. 1.
Figure 2:
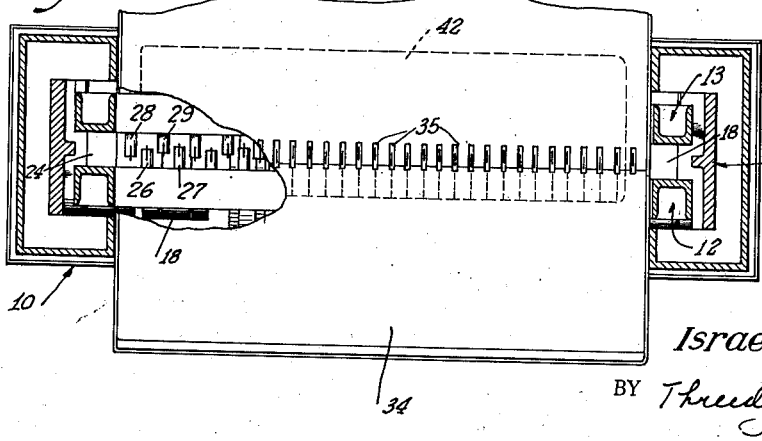
Fig. 2 is a transverse sectional view on line 2—2 in Fig. 1.
Figure 5:
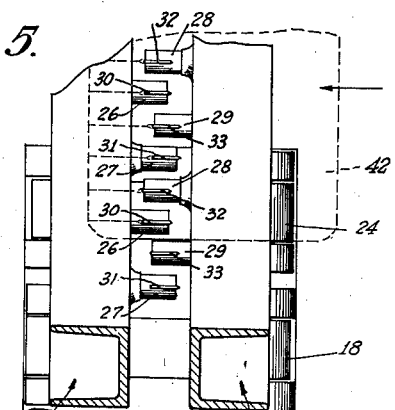
Fig. 5 is a transverse sectional view on line
Figure 6:
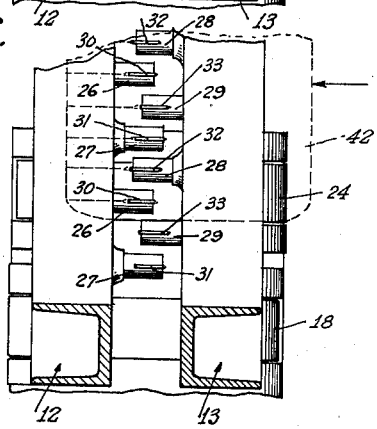
Figure 7:
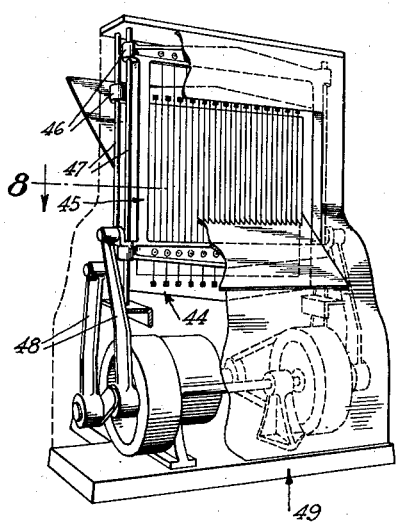
Figure 8:
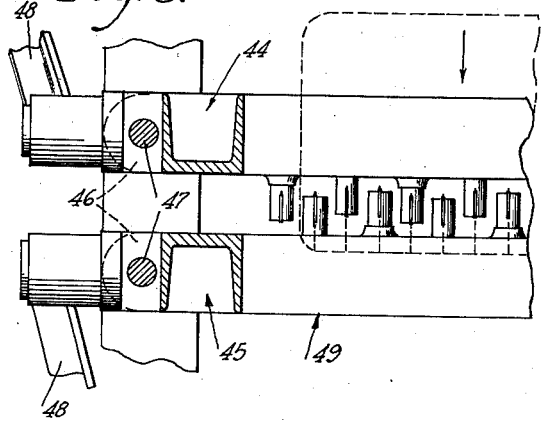

5—5 in Fig. 3 showing the arrangement of the slicing knives when the same are positioned at the upper and lower limits of their stroke;

Fig. 6 is a view similar to Fig. 5, but showing the position of the slicing knives relative to each other when they are positioned at a point approximately midway between the upper and lower ends of their stroke;

Fig. 7 is a perspective view of another form of bread slicing machine having the present invention embodied therein, the knives in this form of the invention moving vertically rather than through an arc as in the form of the invention shown in Figs. 1 to 6, inclusive;

Fig. 8 is a transverse sectional view on line 8 in Fig. 7;

Fig. 9 is a diagrammatic view illustrating how only a part or half of the slicing knives in the new bread slicing machine enter the loaf or start slicing at one time, although the slicing operation is started throughout the entire length or advancing face of the loaf; and Fig. 10 is a diagrammatic view showing the relative positions of the slicing knives when the same are in the body of the loaf.

A preferred form of the present bread slicing machine is shown in Figs. 1 to 6, inclusive, of the drawings, is therein generally indicated at 10, and comprises a supporting frame 11. The bread slicing machine 10 includes two similar knife-carrying frames 12 and 13. The knife-carrying frame 12 is pivotally mounted, at its upper end, and on opposite sides of the same, to links, as at 14, or rocker arms, and these links or rocker arms are pivotally mounted at one end, as at 16, upon the supporting frame 11 adjacent the upper end of the latter.

The knife-carrying frame 12 is pivotally mounted adjacent its lower end, as at 17, upon links or rocker arms 18, and the latter are pivotally mounted at one end, as at 19, upon the supporting frame 11. Similarly, the knife-carrying frame 13 is pivotally mounted adjacent its upper end, as at 20, upon links or rocker arms 21, and these links or rocker arms 21 are pivotally mounted at one end, as at 22, upon the supporting frame 11.

The knife frame 13 is pivotally mounted at its lower end upon links or rocker arms 24, and the latter are in turn pivotally mounted upon the supporting frame 11, the manner of connecting the links or rocker arms 21 and 24 to the supporting frame 13 and the manner of mounting said links or rocker arms 21 and 24 upon the supporting frame 11 being similar to that already shown and described in connection with the knife-carrying frame 12 and the links or rocker arms 15 and 18.

Carried by the knife frame 12 are a plurality of relatively short studs or knife-attaching elements 26 (Fig. 5), and likewise carried by the frame 12 are a plurality of relatively long studs or knife-attaching elements 27, these studs or knife-attaching elements 26 and 27 being staggeredly relative to each other, as shown in Figs. 5 and 6.

In a similar manner the knife frame 13 includes a plurality of relatively long studs or knife-attaching elements 28 and a plurality of relatively short studs or knife-attaching elements 29, and these studs or knife-attaching elements 28 and 29 are staggered relative to each other, as shown in Figs. 5 and 6; it being understood that for each knife-attaching element or stud 26 which is carried by the frame 12 adjacent the upper end of the latter, there is a similar knife-attaching element or stud 26 on the frame 12 adjacent the bottom of the latter and in vertical alignment with the corresponding stud or attaching element 26 which is carried by the frame 12 adjacent the top of the same. These studs or knife-attaching elements 27, 28, and 29 are similarly arranged in pairs relative to each other.

Carried by the relatively short studs or knife-attaching elements 26 on the frame 12 are bread slicing knives 30, and carried by the relatively long studs or knife-attaching elements 27 of the frame 12 are slicing knives 31. Carried by the relatively long studs or knife-attaching elements 28 of the frame 13 are slicing knives 32, and carried by the short studs or knife-attaching elements 29 are slicing knives 33, the knives 30—33, inclusive, being slidably projected through a slot or slots 35 formed in the bread chute 34, and being guided or stabilized in a manner which is well understood in the art.

Pivotally connected to the knife-carrying frame 12, at the lower end of the latter, as at 36 (Fig. 1), is a connecting rod or crank arm 37, and pivotally connected to the knife-carrying frame 13, as at 38, is a connecting rod 39 or crank arm 39, these connecting rods 37 and 39 being operatively connected to a driving mechanism 40 which includes a motor 41 and suitable power transmission devices which are arranged between the motor 41 and the connecting rods 37 and 39.

A modified form of the invention is shown in Figs. 7 and 8, and in so far as the present invention is concerned, this form of the invention is substantially similar to the form of the invention shown in Figs. 1 to 6, inclusive, except for the facts that in this modified form of the invention the knife frames 44—45 of the slicing machine 49, shown in Figs. 7 and 8, are guided by the sleeves 46 which are slidably mounted upon vertical guide rods 47, and the knife frames 44—45 are driven by crank arms 48 which are attached to the knife frames 44—45 at the sides of the latter, as shown in Fig. 7, rather than at the lower ends of the same, as in the preferred form of the invention shown in Figs. 1 to 6, inclusive, so that the slicing knives in this form of the invention, shown in Figs. 7 and 8, travel vertically rather than through an arc, as in the form of the invention shown in Figs. 1 to 6, inclusive.

Operation

In the use of the bread slicing machine shown in Figs. 1 to 6, inclusive, the knife-carrying frames 12 and 13 and the slicing knives carried thereby are alternately reciprocated up and down in the supporting frame 11 by means of the connecting rods 37 and 39 and the driving mechanism 40—41. This movement of the knife-carrying frames 12 and 13 causes the rocker arms or links 15 and 18 and 21 and 24 to rock through an arc, which is indicated by the three positions "A", "B", and "C" in Fig. 3, it being noted that the slicing knives 32 and 33, which are mounted on the frame 13, are rocked by the latter, in a direction toward the advancing loaf 42, (to the left, Fig. 4, to the right, Fig. 3), whereas the knives 30 and 31 which are mounted on the frame 12 are rocked, by the latter in a direction away from the advancing loaf 42 (to the left, Fig. 3, to the right, Fig. 4), by reason of the mounting of the frames 12 and 13 upon the rocker arms 15 and 18 and 21 and 24, respectively.

When the knife-carrying frames 12 and 13 and the slicing knives carried thereby are in either of the positions indicated by "A" and "C", (Fig.

3), that is, at the upper or lower end of their stroke, the slicing knives 30—31—32 and 33 are arranged relative to each other in the position in which they are shown in Fig. 5, wherein it will be noted that the cutting edges (right hand edges as seen in Fig. 5) of the knives 30 and 32 are arranged in the same relative positions, that is, in the same transverse plane (as seen looking from bottom to top in Fig. 5) and the knives 31 and 33 are likewise disposed in the same relative position or in the same transverse plane (Fig. 5) but are out of transverse alignment with the above-mentioned knives 30 and 32 or, in other words, the knives are staggered relative to each other. Hence, the cutting edges of the knives 30 and 31 are simultaneously moved into and out of effective position or slicing contact with the loaf 42 which is guided down the bread chute 34 during the slicing operation while the knives 32 and 33 are at all times disposed in cutting position relative to the loaf 42. This is, of course, not true of the knives in the form of the invention shown in Figs. 7 and 8, wherein the knives move vertically and all slice at one time, except that one set of knives is in a transverse plane relatively forward or ahead of the other set of knives.

It will also be noted by reference to Fig. 6 that the cutting edges (right hand edges of the slicing knives 33) are alterately staggered and disposed in two parallel transverse planes (as seen looking from bottom to top in Fig. 6) while the right-hand edges of the other set of blades 30—31 are alternately staggered so that they also lie in one of two transverse planes.

It will be further noted by reference to Fig. 6 (which illustrates a position midway between the ends of the stroke of the frames 12 and 13,—position "B", Fig. 3), that the blades (30, 31, 32, and 33) when in this position are disposed with their cutting edges out of alignment relative to the transverse plane of the frames 12 and 13, that is to say, with the blades 33 in the foremost cutting position, the blades 31 in a plane just rearwardly of the blade 33, the blades 32 in a plane just rearwardly of the blades 31, and the blades 30 in a plane just rearwardly of the blades 32, relative to the direction of movement of the loaf through the slicing machine, so that when the parts are thus disposed there is a staggered arrangement of slicing units each including a set of blades (30, 31, 32, and 33, Fig. 6), the edges of which lie in one of two transverse planes.

It will be noted that by reason of the foregoing staggered arrangement of the cutting edges of the slicing knives only part of the slicing knives in each of the frames 12 and 13 enter into the crust of the loaf to start the cutting operation, at one time, and, as will be explained more fully hereinafter, by reason of this fact the friction of the loaf upon the slicing knives is reduced and minimized and other objectionable features incidental to the prior art bread slicers are eliminated, and the loaves 42 are held in proper slicing position and against up and down vibrating movement upon the chute 34 as they pass through the slicing machine, and hence the slices produced by a slicing machine embodying the present invention are more uniform and the production of crumbs and the frictional drag of the loaf upon the knives during the slicing operation is reduced and minimized, all of which will be explained more fully hereinafter.

Figure 4:
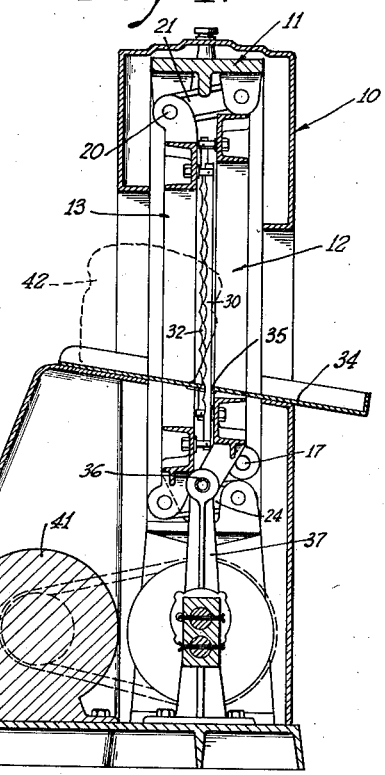
Fig. 4 is a vertical sectional view on line 4—4 in Fig. 1.

Attention is called to the fact that while the blades shown in Fig. 4 are of the scalloped type, that other styles of blade may be used, including the straight-edge and saw-tooth or serrated types, and the terms "knife edge," "cutting edge" and "blade edge" as used herein refer to a substantially straight-line joining or drawn through the foremost or peak portions of the serrations, scallops or other serrations, while in the straight-edge type, this line, of course, is the cutting edge, itself.

The relative positions of the knives when the same and the frames 12 and 13 are disposed midway between the upper and lower limits of their strokes is indicated at position "B", Fig. 3, and is shown in Fig. 6, wherein it will be noted that the cutting edges (right hand edges, as seen in Figs. 5 and 6) of the slicing knives 33 are disposed in a transverse plane which is positioned forwardly (to the right, Figs. 5 and 6, relative to the direction of movement of the loaves 42 through the slicing machine, right to left, Fig. 5) of the transverse plane of the cutting edges of the slicing knives 32, 31, and 30, and that the transverse plane in which the cutting edges of the slicing knives 30 are aligned (as seen looking from bottom to top, Fig. 6) is disposed rearwardly of the transverse plane in which the cutting edges of the slicing knives 33, 32 and 31 are arranged.

It will be noted, by reference to Fig. 3, that the cutting edges (right hand edges, as seen in Fig. 6) of the several groups of slicing knives 30, 32—31, and 33 (as seen in Fig. 6) are successively moved into slicing contact or engagement with the loaves 42 as the latter pass through the slicing machine (right to left, Fig. 5) by reason of the pivotal mounting of the knife frames 12 and 13 upon the rocker arms 15, 18, 21, and 24, and the mounting of the latter upon the supporting frame 11, this mounting of the knife frames 12 and 13 and their supporting rocker arms 15, 18, 21, and 24 causing the knife frames 12 and 13 and the slicing knives 30, 31, 32, and 33 to move alternately forwardly and backwardly (relative to the direction of movement of the loaves 42 through the slicing machine), that is, into and out of slicing contact or engagement with the loaves 42 as the latter pass through the slicing machine; the several groups of slicing knives 30, 31, 32, and 33 thus moving not only alternately up and down, but into and out of slicing contact with the loaves 42 as the latter move through the slicing machine 10 during the slicing operation.

It will be noted by reference to the diagrammatic views, Figs. 9 and 10, that only a part, preferably half, of the slicing knives enter the crust of the loaf, that is, start the slicing operation, at one time (Fig. 9), and the same is true, of course, of the knives emerging from the loaf; and after the first half of the blades are well through the hard crust, then the second half of the blades start entering the same. By reason of this fact the tendency of the knives to crush the loaf and thereby break up the crust is greatly reduced and minimized and the production of crumbs materially lessened.

This feature is especially important in connection with a so-called soft center texture loaf of bread, such, for example, as a loaf of white bread having a hard crust, it being understood that when all of the knives start the slicing operation or enter into the crust of such a loaf at one time, the total or combined pressure of the knives against the loaf tends to crush the loaf and peel the same off, and thereby not only destroy the crust and cause a relatively large production of crumbs, but also to distort and tear the fibers in the body of the loaf. This objectionable feature is eliminated by the present invention, wherein only half of the knives start the slicing operation at one time, thereby preserving the crust, which is to be desired, and reducing the production of crumbs and the friction incidental thereto.

When the knives of a bread slicing machine pass through the loaf during the slicing operation, they naturally expand the body of the loaf because of the space occupied by the knives themselves and the thickness of the same, and this force of the knives upon the body of the loaf causes the latter to exert very considerable amount of drag or friction upon the knives, since the body of the loaf and the fibrous texture of the same naturally tends to resist the distorting action of the knives during the slicing operation. In the use of the present invention, however, as may be seen by reference to Fig. 10, only a part, half, of the blades are actually performing the slicing operation and tending to distort the body of the loaf at one time, and as this first set or half of the knives cuts the body of the loaf and the fibrous structure of the same tends to close the gaps or incisions made by the first set of knives, thereby materially reducing the drag or friction of the body of the loaf and the fibers of the same (caused by the first set of knives) upon the second set or half of the knives as the latter perform their cutting operation. In this manner the friction of the loaf upon the knives during the slicing operation is greatly reduced and the efficiency of the slicing machine correspondingly increased. This feature is particularly valuable and noticeable when slicing a so-called heavy texture loaf, such as rye, and actual tests have shown that a loaf of bread will pass through a bread slicing machine embodying the present invention at least three times as fast as through the old types of slicers by reason of the reduced friction of the loaf upon the knives which is effected by the present invention.

While the present invention and arrangement of knives has been shown (in Figs. 1 to 6, inclusive) as associated with, and embodied in, a slicer in which the knife-carrying frames and the knives move through an arc, whereas in Figs. 7 and 8 the present invention is shown as applied to a slicer in which the knife-carrying frames and knives do not move through an arc, but vertically, it is to be understood that the present invention is not limited to use with the type of bread slicers shown, but is applicable in general to any type of bread slicing machine which employs alternating series of spaced reciprocating slicing knives.

It is also to be understood that the present invention is not limited to the particular staggering arrangement of the blades illustrated in the drawings, since this staggering of the blades may be varied very considerably without departing from the spirit or scope of the present invention.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a bread slicing machine, a supporting frame, a pair of alternately reciprocating knife-carrying frames movably mounted upon said supporting frame, and slicing knives carried by said knife-carrying frames, the cutting edges of said knives in each said frame being staggered alternately relative to each other and with respect to the edges of the knives in the other said frame.

2. In a bread slicing machine, a support, a pair of oppositely disposed blade-carrying frames mounted for reciprocal movement on said support, means for simultaneously reciprocating said frames in opposite directions, and blades removably mounted in said frames in spaced parallel relation, the blades in each said frame having their cutting edges disposed alternately in two parallel planes, and the blades of one said frame being interposed between blades of the opposite frame, all of the blades being adapted to enter the bread at substantially the same time.

3. In a slicing machine, oppositely disposed blade-carrying frames, means mounting said frames for reciprocal motion, driving means for simultaneously reciprocating said frames in opposite directions, slicing blades mounted in spaced parallel relation in each of said frames and having their cutting edges all disposed in two substantially parallel planes transverse to the direction of movement of the sliced article thereagainst, the blades of one frame being interspersed between the blades of an opposite said frame.

4. In a bread slicing machine, blade-carrying frames, means mounting said frames in opposite relation and for reciprocatory motion along an arcuate path, a plurality of blades mounted in spaced and substantially parallel relation in each of said frames, the cutting edges of all blades facing in a particular direction, and the blades in each frame having their cutting edges staggered alternatively in a manner to lie in only two parallel planes transverse to said particular direction, the blades of each said frame being interposed between blades of the opposite frame, and means for simultaneously reciprocating said frames.

5. In a bread slicing machine, blade-carrying frames, means mounting said frames in opposite relation and for reciprocatory motion along an arcuate path, a plurality of blades mounted in spaced and substantially parallel relation in each of said frames, the cutting edges of all blades facing in a particular direction, and the blades in each frame having their cutting edges staggered alternately and all disposed in two parallel planes transverse to said particular direction, the blades of each said frame being interposed between blades of the opposite frame, together with driving means for reciprocating said frames simultaneously in opposite directions along said arcuate paths.

6. In a bread slicing machine, blade-carrying frames, means mounting said frames in opposite relation and for reciprocatory motion along an arcuate path, a plurality of blades mounted in spaced and substantially parallel relation in each of said frames, the cutting edges of all blades facing in a particular direction, and the blades in each frame having their cutting edges staggered alternately in a manner to lie all in two parallel planes transverse to said particular direction, the blades of each said frame being interposed between blades of the opposite frame, means supporting a loaf of bread for movement along the line of said particular direction so as to bear against all of said cutting edges at substantially the same moment, together with driving means for reciprocating said frames simultaneously in opposite directions.

7. A machine for slicing bread and the like, and including a pair of blade carrying frames, means mounting said frames in confronting relation and for reciprocal motion, means for supporting an article to be sliced, such as bread, for movement toward and through said frames, means in each of said frames removably holding a plurality of cutting blades in spaced parallel relation with their cutting edges staggered alternately and all aligned in two parallel planes transverse to the direction of movement of an article through said frames as aforesaid, the blades of one frame being positioned between blades of the opposite frame, together with driving means for reciprocating said frames in opposite directions.

8. A bread slicing machine including a pair of oppositely disposed blade supporting frames, and means mounting the same for reciprocal arcuate movement, driving means for reciprocating said frames simultaneously in opposite directions, each of said frames having stud means for removably holding blades in spaced parallel relation, blades held by said stud means with their cutting edges disposed alternately in one of two parallel planes which lie transversely of the line of movement of a loaf of bread against the same, the blades of one frame being positioned to reciprocate between the blades of the other said frame, and means supporting a loaf of bread for movement against and past said blades.

9. A bread slicing machine including a pair of blade holders, means mounting said holders in closely confronting relation and for reciprocatory movement along an arcuate path, driving means for reciprocating said holders in opposite directions, each of said holders having removable blades supported and spaced in parallel relation therein and the cutting edges of the blades in each frame being staggered and all situated in one of two closely paralleled planes, and said edges all facing in one direction, the blades of one frame being interpositioned between blades of the opposite frame, and means supporting a loaf for advancing movement parallel to the aforesaid planes and against and past said blades.

10. A bread slicing machine including a pair of oppositely-disposed knife frames, means supporting said frames for reciprocal movement along an arcuate path, driving means for reciprocating said frames in opposite directions, each of said frames having a plurality of spaced parallel blades arranged with their cutting edges facing in the same direction and the blades in each frame having their cutting edges lying in only two transverse parallel planes and in staggered relation with each other, the blades of one frame being interposed between the blades of the opposite frame.

11. In a slicing machine, means movably supporting blades in sets with the blades of one set alternately interposed between blades of another set, the blades of each set being staggered so as to align all of their cutting edges in one of two substantially transverse parallel planes, together with driving mechanism for reciprocating said sets simultaneously in opposite directions.

ISRAEL C. GELLMAN.